(12) United States Patent
Hagano et al.

(10) Patent No.: US 10,507,723 B2
(45) Date of Patent: Dec. 17, 2019

(54) OPENING-CLOSING APPARATUS FOR FUEL TANK

(71) Applicant: TOYODA GOSEI CO., LTD., Kiyosu-shi, Aichi-ken (JP)

(72) Inventors: Hiroyuki Hagano, Kiyosu (JP); Kazuya Watanabe, Kiyosu (JP); Norihiko Ishihara, Kiyosu (JP); Go Oue, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 335 days.

(21) Appl. No.: 15/381,193

(22) Filed: Dec. 16, 2016

(65) Prior Publication Data
US 2017/0182880 A1  Jun. 29, 2017

(30) Foreign Application Priority Data

Dec. 24, 2015 (JP) .................................. 2015-251501

(51) Int. Cl.
*B60K 15/04* (2006.01)
*B60K 15/03* (2006.01)

(52) U.S. Cl.
CPC .... *B60K 15/04* (2013.01); *B60K 2015/03328* (2013.01); *B60K 2015/0461* (2013.01)

(58) Field of Classification Search
CPC .............. B60K 15/04; B60K 2015/047; B60K 2015/0474; B60K 2015/0477;
(Continued)

(56) References Cited

U.S. PATENT DOCUMENTS 4,917,157 A * 4/1990 Gifford ................. B60K 15/04
123/519
5,090,459 A 2/1992 Aoki et al.
(Continued)

FOREIGN PATENT DOCUMENTS

JP S51-31830 U 3/1976
JP H03-267565 A 11/1991
(Continued)

OTHER PUBLICATIONS

Office action dated Jan. 8, 2019 issued in corresponding JP patent application No. 2015-251501 (and English translation thereof).
(Continued)

*Primary Examiner* — Anthony D Stashick
*Assistant Examiner* — Onekki P Jolly
(74) *Attorney, Agent, or Firm* — Posz Law Group, PLC

(57) ABSTRACT

An opening-closing apparatus for a fuel tank comprises a fuel passage-forming portion configured to form a fuel passage that is arranged to introduce a supplied liquid fuel to the fuel tank; an insertion-side opening-closing mechanism configured to open and close the fuel passage; a tank-side opening-closing mechanism located on a fuel tank side of the insertion-side opening-closing mechanism and configured to open and close the fuel passage; a liquid discharge path configured to allow for communication of a portion of the fuel passage between the insertion-side opening-closing mechanism and the tank-side opening-closing mechanism to the outside of the opening-closing apparatus; and an open-close valve configured to open and close the liquid discharge path and to be opened toward the outside. This configuration of the opening-closing apparatus for the fuel tank reduces dust and the like invaded from the outside into the fuel passage which a liquid fuel passes through.

11 Claims, 9 Drawing Sheets

(58) Field of Classification Search
CPC .. B60K 2015/0553; B60K 2015/03328; B60K 2015/03473; B60K 2015/0429; B60K 2015/0461; B60K 2015/03368; B60K 2015/0467; B60K 15/035; B60K 2015/03523; B60K 2015/048; B60K 2015/03528; B60K 2015/03538; B60K 2015/03542; B60K 2015/03552; B60K 2015/03557; B60K 2015/03561; B60K 2015/0358; B65D 51/1616; B65D 90/34; Y10T 137/1812
USPC ............ 220/86.2, 203.03, 203.29, 203.28; 141/286
See application file for complete search history.

(56) References Cited

U.S. PATENT DOCUMENTS

| | | | | |
|---|---|---|---|---|
| 5,103,877 | A * | 4/1992 | Sherwood | B60K 15/03519 123/519 |
| 5,263,511 | A | 11/1993 | Ohasi et al. | |
| 5,437,317 | A * | 8/1995 | Takatsuka | B60K 15/03519 137/589 |
| 5,730,194 | A * | 3/1998 | Foltz | B60K 15/04 137/588 |
| 5,740,842 | A * | 4/1998 | Maier | B60K 15/03519 137/588 |
| 5,791,387 | A * | 8/1998 | Palvolgyi | B60K 15/05 141/301 |
| 6,321,801 | B1 * | 11/2001 | Hagano | B60K 15/04 141/301 |
| 6,446,826 | B1 | 9/2002 | Foltz et al. | |
| 6,691,750 | B1 * | 2/2004 | Foltz | B60K 15/04 141/348 |
| 2011/0079322 | A1 * | 4/2011 | Beier | B60K 15/0406 141/350 |
| 2012/0192994 | A1 * | 8/2012 | Hagano | B60K 15/04 141/379 |
| 2013/0075395 | A1 * | 3/2013 | Hagano | B60K 15/0406 220/86.2 |
| 2013/0075399 | A1 * | 3/2013 | Hagano | B60K 15/0406 220/254.3 |
| 2013/0168392 | A1 * | 7/2013 | Kuyama | B60K 15/04 220/86.2 |
| 2013/0193140 | A1 * | 8/2013 | Hagano | B60K 15/04 220/86.2 |
| 2013/0206757 | A1 * | 8/2013 | Nagai | B60K 15/0406 220/86.2 |
| 2013/0213963 | A1 * | 8/2013 | Chretien | B67D 7/06 220/86.2 |
| 2014/0091095 | A1 | 4/2014 | Hagano et al. | |
| 2015/0001215 | A1 * | 1/2015 | Kito | B60K 15/04 220/86.2 |
| 2015/0048087 | A1 * | 2/2015 | Hagano | B60K 15/04 220/86.2 |

FOREIGN PATENT DOCUMENTS

| | | |
|---|---|---|
| JP | H04-317821 A | 11/1992 |
| JP | 2014-069618 A | 4/2014 |
| JP | 2014-81069 A | 5/2014 |

OTHER PUBLICATIONS

Office Action dated Aug. 27, 2019 issued in corresponding JP patent application No. 2015-251501 (and English translation).

* cited by examiner

OPENING-CLOSING APPARATUS FOR FUEL TANK

CROSS-REFERENCE TO RELATED APPLICATION

The present application claims priority from Japanese patent application 2015-251501 filed on Dec. 24, 2015, the content of which is hereby incorporated by reference into this application.

BACKGROUND

Technical Field

The disclosure relates to an opening-closing apparatus for a fuel tank.

Related Art

An opening-closing apparatus for a fuel tank has conventionally be known to be opened when a liquid fuel is to be supplied from a fueling nozzle into a fuel tank of an automobile and to be closed when no liquid fuel is supplied. JP 2014-69618A describes an opening-closing apparatus for a fuel tank including a liquid discharge path in a labyrinthine structure arranged to connect a fuel passage through which a supplied liquid fuel passes with outside, in order to discharge the fuel flowing over from the fuel passage to the outside and prevent invasion of the dust or the like from the outside.

In the opening-closing apparatus for the fuel tank described in JP 2014-69618A, however, the liquid discharge path is arranged to continuously connect the fuel passage with the outside. Irrespective of the liquid discharge path formed in the labyrinthine structure, there is accordingly a possibility that the dust or the like is invaded from outside into the fuel passage.

SUMMARY

In order to solve at least part of the problems described above, the disclosure may be implemented by aspects or configurations described below.

(1) According to one aspect of the disclosure, there is provided an opening-closing apparatus for a fuel tank. The opening-closing apparatus for the fuel tank comprises a fuel passage-forming portion configured to form a fuel passage that is arranged to introduce a supplied liquid fuel to the fuel tank; an insertion-side opening-closing mechanism fixed to the fuel passage-forming portion and configured to open and close a filler port of the fuel passage; a tank-side opening-closing mechanism fixed to the fuel passage-forming portion, located on a fuel tank side of the insertion-side opening-closing mechanism and configured to open and close the fuel passage; a liquid discharge path configured to allow for communication of a portion of the fuel passage between the insertion-side opening-closing mechanism and the tank-side opening-closing mechanism with outside of the opening-closing apparatus; and an open-close valve configured to open and close the liquid discharge path and to be opened toward the outside of the opening-closing apparatus. In the opening-closing apparatus for the fuel tank of this aspect, the open-close valve serves to open and close the liquid discharge path that is arranged to allow for communication of the fuel passage with the outside of the opening-closing apparatus. The fuel passage thus does not continuously communicate with the outside of the opening-closing apparatus. This configuration suppresses invasion of the dust or the like from outside through the liquid discharge path into the fuel passage. This configuration also enables a liquid such as rainwater entering the fuel passage during fueling to be discharged to the outside by opening the open-close valve toward the outside. This configuration is more likely to prevent invasion of the dust or the like from the outside.

(2) In the opening-closing apparatus for the fuel tank of the above aspect, the liquid discharge path may have a liquid reservoir in which a liquid is temporarily accumulated when the open-close valve is closed, and the open-close valve may be configured such that mass of the liquid accumulated in the liquid reservoir is utilized as a force of opening the open-close valve. In the opening-closing apparatus for the fuel tank of this aspect, the open-close valve is opened by the mass of the liquid accumulated in the liquid reservoir. The liquid discharge path can thus be opened and closed by the simple configuration.

(3) In the opening-closing apparatus for the fuel tank of the above aspect, the open-close valve may be formed as part of a plate-like member, and the open-close valve may have a support end that is a grooved portion formed in the plate-like member to be thinner than a remaining part of the open-close valve. In the opening-closing apparatus for the fuel tank of this aspect, the open-close valve is opened by folding the grooved portion. The liquid discharge path can thus be opened and closed by the simple configuration.

(4) In the opening-closing apparatus for the fuel tank of any of the above aspects, the open-close valve may be formed from a plate-like member, may have a shaft as a support end in an upper portion of the open-close valve and may be rotated about the shaft. The opening-closing apparatus for the fuel tank of this aspect enables the liquid discharge path to be opened and closed by the simple configuration.

(5) In the opening-closing apparatus for the fuel tank of any of the above aspects, the open-close valve may be configured such that mass of the open-close valve is utilized as a force of closing the open-close valve. In the opening-closing apparatus for the fuel tank of this aspect, the open-close valve uses the own weight of the open-close valve as the force of closing the open-close valve. The liquid discharge path can thus be opened and closed by the simple configuration.

(6) The opening-closing apparatus for the fuel tank of any of the above aspects may further comprise a magnetic element that has a portion opposed to the open-close valve and at least partly magnetized and that is fixed in position relative to the liquid discharge path. The open-close valve may be made of a magnetic material such that a portion of the open-close valve opposed to the magnetic element is in close contact with the magnetic element. The configuration of the opening-closing apparatus for the fuel tank of this aspect enables the mass of the liquid accumulated in the liquid reservoir, which is required to close the open-close valve, to be finely adjusted by regulating the strength of the magnetism in the magnetic element and the open-close valve.

(7) The opening-closing apparatus for the fuel tank of any of the above aspects may further comprise an elastic member configured to apply a force of closing the open-close valve. In the opening-closing apparatus for the fuel tank of this aspect, a pressing force of closing the open-close valve is applied by the elastic member. This configuration provides the high flexibility in setting of the force of opening and closing the open-close valve by regulating the elastic member.

(8) The opening-closing apparatus for the fuel tank of any of the above aspects may further comprise an open-close valve stopper configured to restrict an opening of the open-close valve. The opening-closing apparatus for the fuel tank of this aspect is configured to regulate the opening of the open-close valve and accordingly prevents the open-close valve from being opened to an excessive degree. This configuration suppresses plastic deformation of the open-close valve.

The disclosure may be implemented by any of various aspects other than the opening-closing apparatus for the fuel tank, for example, an automobile with the opening-closing apparatus for the fuel tank mounted thereon and a method of manufacturing the opening-closing apparatus for the fuel tank.

In the opening-closing apparatus according to any of the above aspects, the open-close valve is configured to open and close the liquid discharge path that is arranged to allow for communication of the fuel passage with outside of the opening-closing apparatus. The fuel passage thus does not continuously communicate with the outside of the opening-closing apparatus. This configuration suppresses invasion of the dust or the like from outside through the liquid discharge path into the fuel passage. This configuration also enables a liquid such as rainwater entering the fuel passage during fueling to be discharged to the outside by opening the open-close valve.

DESCRIPTION OF EMBODIMENTS

Figure 1:
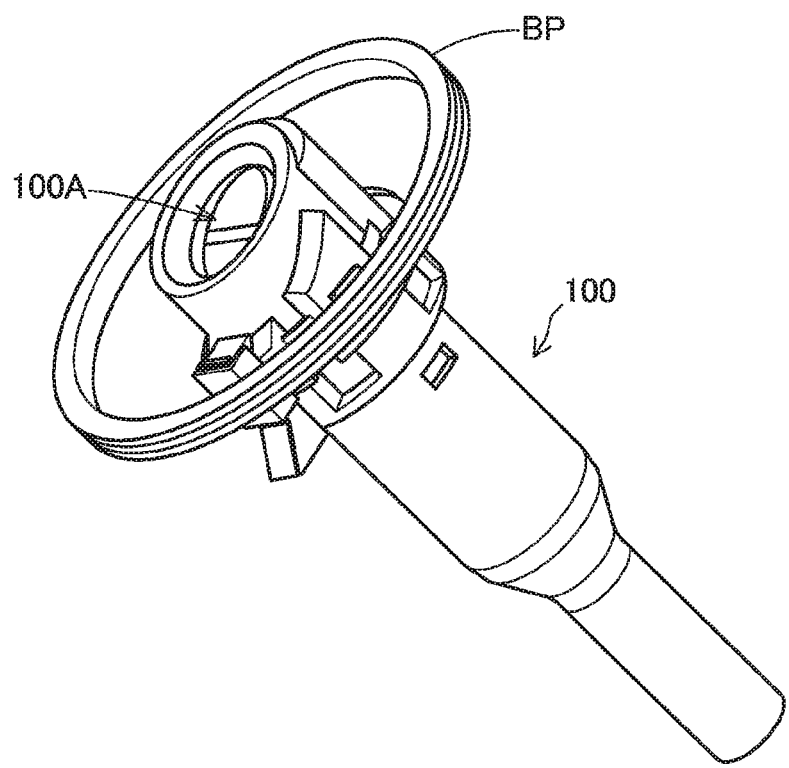
FIG. 1 is a perspective view illustrating a filler neck that serves as an opening-closing apparatus for a fuel tank according to a first embodiment of the disclosure.

A. First Embodiment (1) General Configuration of Opening-Closing Apparatus for Fuel Tank FIG. 1 is a perspective view illustrating a filler neck 100 that serves as an opening-closing apparatus for a fuel tank according to a first embodiment of the disclosure. FIG. 1 illustrates the filler neck 100 and a base plate BP configured to fix the filler neck 100 to a vehicle. According to this embodiment, the base plate BP is a member in a disk-like shape with a circular hole formed at the center thereof to receive part of the filler neck 100 inserted therein. The base plate BP is made of a rubber material that is an elastic body. The base plate BP may have any other configuration that is able to fix the filler neck 100. According to another embodiment, the base plate BP may be formed in a rectangular shape that is different from the disk-like shape and may be made of a resin material other than rubber.

The filler neck 100 is a cylindrical member that is fixed to the base plate BP of the vehicle. The filler neck 100 is configured to introduce a liquid fuel such as gasoline that is supplied from a fueling nozzle (not shown) inserted into a filler port 100A, to a fuel tank (not shown). The fuel tank is connected with the filler neck 100 via a rubber hose (not shown) attached to an opposite side of the filler port 100A-side of the filler neck. In the description hereof, the side of the filler neck 100 to be connected with the fuel tank is also called "tank side", and the filler port 100A-side of the filler neck 100 is also called "insertion side". The tank side in the description hereof corresponds to the fuel tank side in the claims.

(2) Configuration and Operations of Respective Components of Filler Neck

Figure 2:
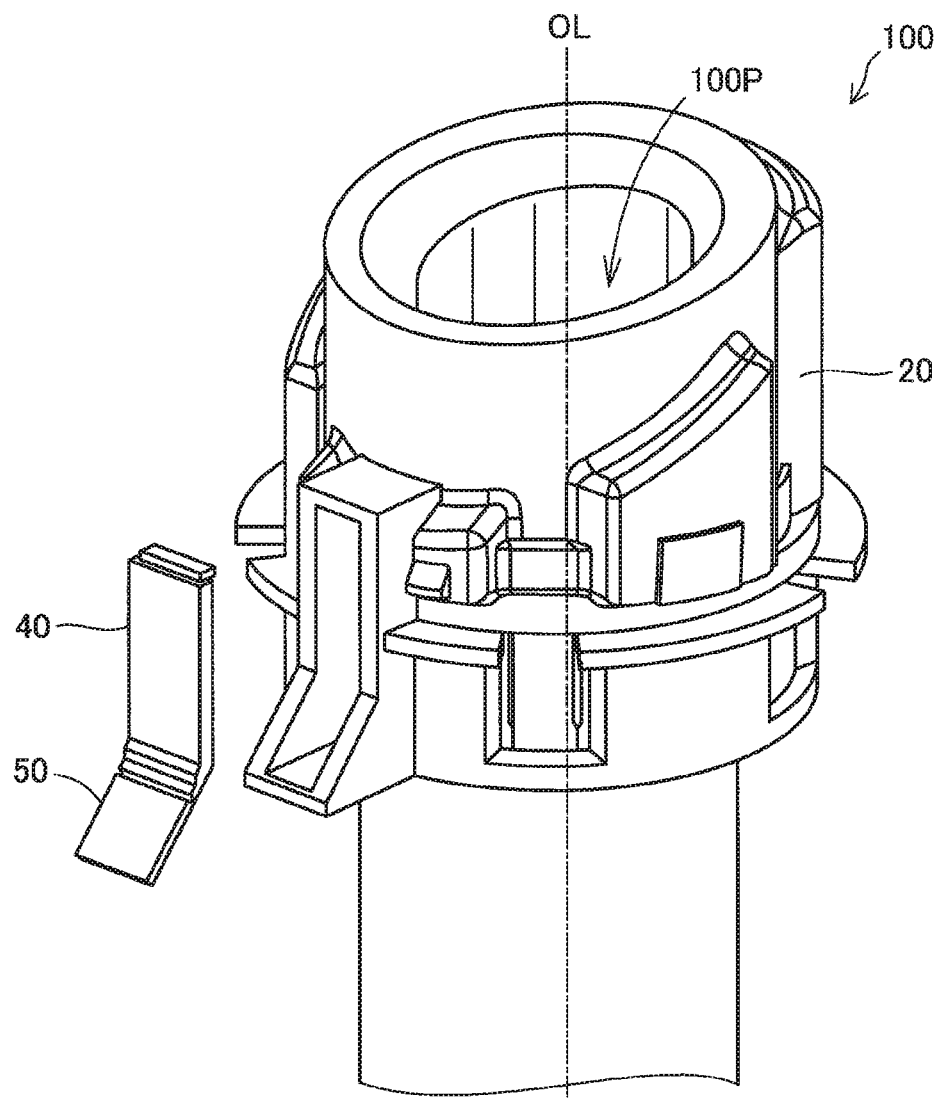
FIG. 2 is an enlarged perspective view illustrating part of the filler neck.
Figure 3:
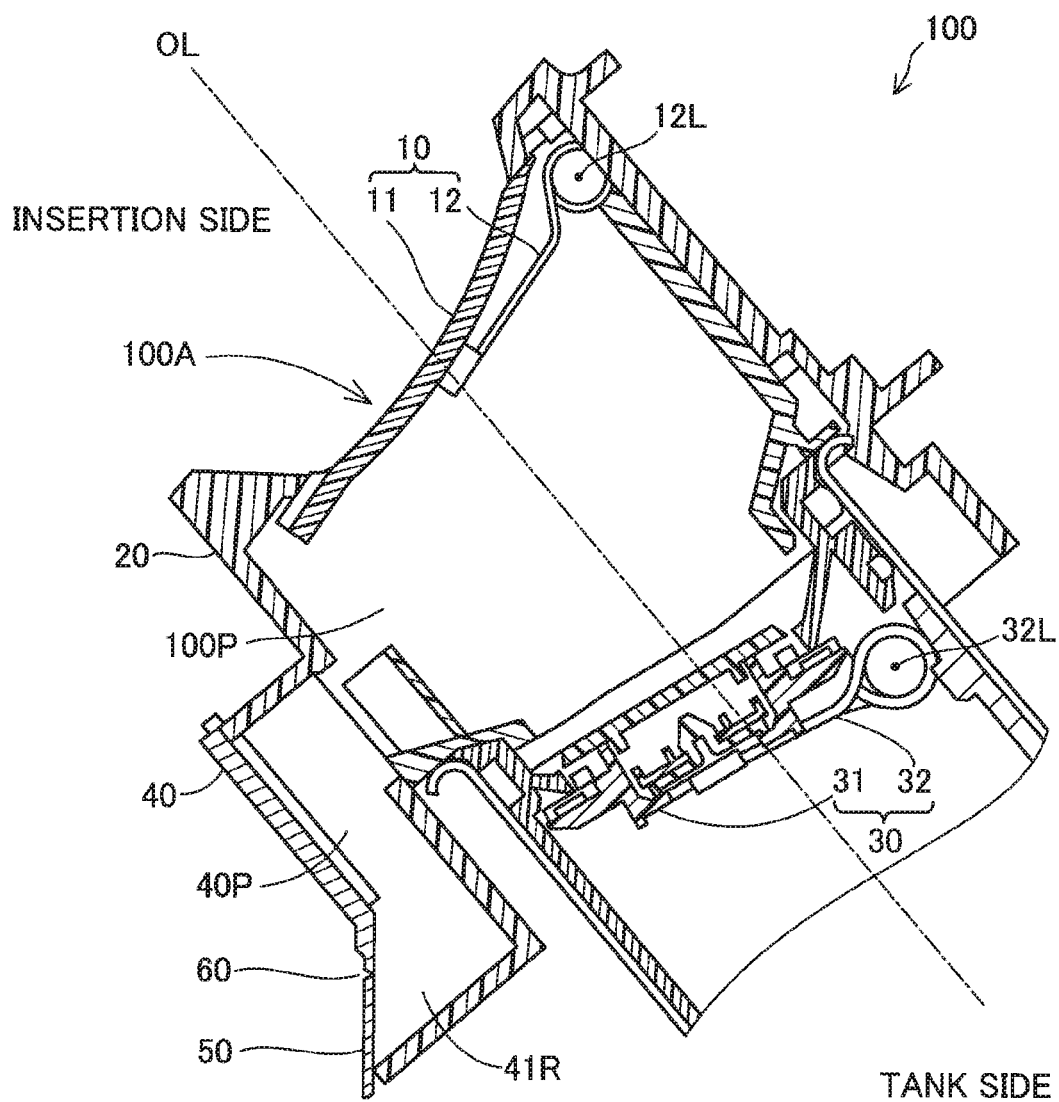
FIG. 3 is a sectional view illustrating the part of the filler neck shown in FIG. 2.

FIG. 2 is an enlarged perspective view illustrating part of the filler neck 100. FIG. 3 is a sectional view illustrating the part of the filler neck 100 shown in FIG. 2. FIG. 2 illustrates part of the insertion side of the filler neck 100. As shown in FIG. 3, the filler neck 100 may include a fuel passage-forming portion 20 configured to form a fuel passage 100P, an insertion-side opening-closing mechanism 10 that are configured to open and close the fuel passage 100P and a tank-side opening-closing mechanism 30, a liquid discharge path-forming portion 40 configured to form a liquid discharge path 40P, and an open-close valve 50. In the filler neck 100 shown in FIG. 2, the liquid discharge path-forming portion 40 and the open-close valve 50 are detached from the fuel passage-forming portion 20.

The fuel passage-forming portion 20 is in a cylindrical shape and is configured to form the fuel passage 100P as a space inside of the cylinder. The fuel passage 100P is arranged to introduce the supplied liquid fuel from the filler port 100A to the fuel tank (not shown) along an axis OL that is a center axis of the filler neck 100. The insertion-side opening-closing mechanism 10 is an open-close mechanism configured to open the filler port 100A when the fueling nozzle is inserted and to close the filler port 100A while the fueling nozzle is not inserted. The insertion-side opening-closing mechanism 10 may include an insertion-side open-close member 11 configured to open and close the filler port 100A, and an insertion-side spring 12 fixed to the fuel passage-forming portion 20 such as to press the insertion-side open-close member 11 in a closing direction. The insertion-side open-close member 11 is formed in a disk-like shape with its central portion concaved toward the tank side. The insertion-side spring 12 is fixed to the fuel passage-forming portion 20 at its fixation end 12L and is also fixed to the central portion of the insertion-side open-close member 11 at its free end that is opposite to the fixation end 12L. The insertion-side spring 12 rotates about the fixation end 12L in a predetermined angular range so as to press the insertion-side open-close member 11 in a closing direction of the fuel passage 100P. The insertion-side spring 12 is arranged such that the fixation end 12L is located above the free end in the direction of gravity in the state that the filler neck 100 is mounted on the vehicle and the insertion-side opening-closing mechanism 10 is closed. In other words, the insertion-side spring 12 is located on the upper side of the axis OL in the direction of gravity.

In the process of insertion of the fueling nozzle, when the fueling nozzle comes into contact with the insertion-side open-close member 11 and applies a stronger force than the pressing force of the insertion-side spring 12 to the insertion-side open-close member 11 toward the tank side, the insertion-side open-close member 11 rotates about the fixation end 12L toward the tank side, so as to open the insertion-side opening-closing mechanism 10.

The tank-side opening-closing mechanism 30 is an open-close mechanism that is placed on the tank side of the insertion-side opening-closing mechanism 10 and is configured to open and close the fuel passage 100P. The tank-side opening-closing mechanism 30 may include a tank-side open-close member 31 configured to open and close the fuel passage 100P, and a tank-side spring 32 fixed to the fuel passage-forming portion 20 such as to press the tank-side open-close member 31 in a closing direction. The tank-side open-close member 31 is, for example, a flap valve configured to prevent the reverse flow of the liquid fuel from the tank side toward the insertion side. The tank-side spring 32 is fixed to the fuel passage-forming portion 20 at its fixation end 32L and is also fixed to the tank-side open-close member 31 at its free end that is opposite to the fixation end 32L. The tank-side spring 32 rotates about the fixation end 32L in a predetermined angular range so as to press the tank-side open-close member 31 in a closing direction of the fuel passage 100P. The tank-side spring 32 is arranged such that the fixation end 32L is located above the free end in the direction of gravity in the state that the filler neck 100 is mounted on the vehicle and the tank-side opening-closing mechanism 30 is closed. In other words, the tank-side spring 32 is located on the upper side of the axis OL in the direction of gravity like the insertion-side spring 12 of the insertion-side opening-closing mechanism 10.

The liquid discharge path-forming portion 40 is located on a side face of the fuel passage-forming portion 20 and is configured to form a liquid discharge path 40P inside thereof. The liquid discharge path-forming portion 40 is located below the fuel passage-forming portion 20 in the direction of gravity when the filler neck 100 is fixed to the vehicle. In other words, according to this embodiment, the liquid discharge path-forming portion 40 and the liquid discharge path 40P are located on the lower side of the axis OL in the direction of gravity when the filler neck 100 is fixed to the vehicle. Additionally the liquid discharge path-forming portion 40 and the liquid discharge path 40P are arranged on the opposite side of the fixation end 12L of the insertion-side spring 12 and the fixation end 32L of the tank-side spring 32 with respect to the axis OL.

The liquid discharge path 40P is arranged to communicate with the fuel passage 100P that is formed between the insertion-side opening-closing mechanism 10 and the tank-side opening-closing mechanism 30. In other words, the liquid discharge path 40P is a flow path that is located on the tank side of the insertion-side opening-closing mechanism 10 and is branched off from the fuel passage 100P located on the insertion side of the tank-side opening-closing mechanism 30. The open-close valve 50 is a valve located below the liquid discharge path-forming portion 40 in the direction of gravity in the state that the filler neck 100 is mounted on the vehicle. The open-close valve 50 is an elastic member that is formed from a plate-like rubber material and is configured to block or allow for connection of the liquid discharge path 40P with outside of the liquid discharge path 40P. The open-close valve 50 may include a grooved portion 60 that is formed to be thinner than the remaining part of the open-close valve 50. The open-close valve 50 is configured to rotate with respect to the grooved portion 60 as the support end. According to this embodiment, the open-close valve 50 is arranged to be parallel to the direction of gravity in the state that the filler neck 100 is mounted on the vehicle. According to this embodiment, the liquid discharge path 40P is not connected with outside of the filler neck 100 in the state that the open-close valve 50 is not opened. In other words, the open-close valve 50 is hung from an end of the liquid discharge path-forming portion 40 with respect to the grooved portion 60 as the fulcrum. The liquid discharge path 40P is a closed space in the state that the open-close valve 50 is not opened. A liquid reservoir 41R is formed in part of the liquid discharge path 40P. In the state that the open-close valve 50 is closed, the liquid reservoir 41R is configured to temporarily accumulate, for example, the liquid fuel or water therein. The opening and closing operations of the open-close valve 50 will be described later.

(3) Functions and Advantageous Effects of Open-Close Valve 50

Figure 4:
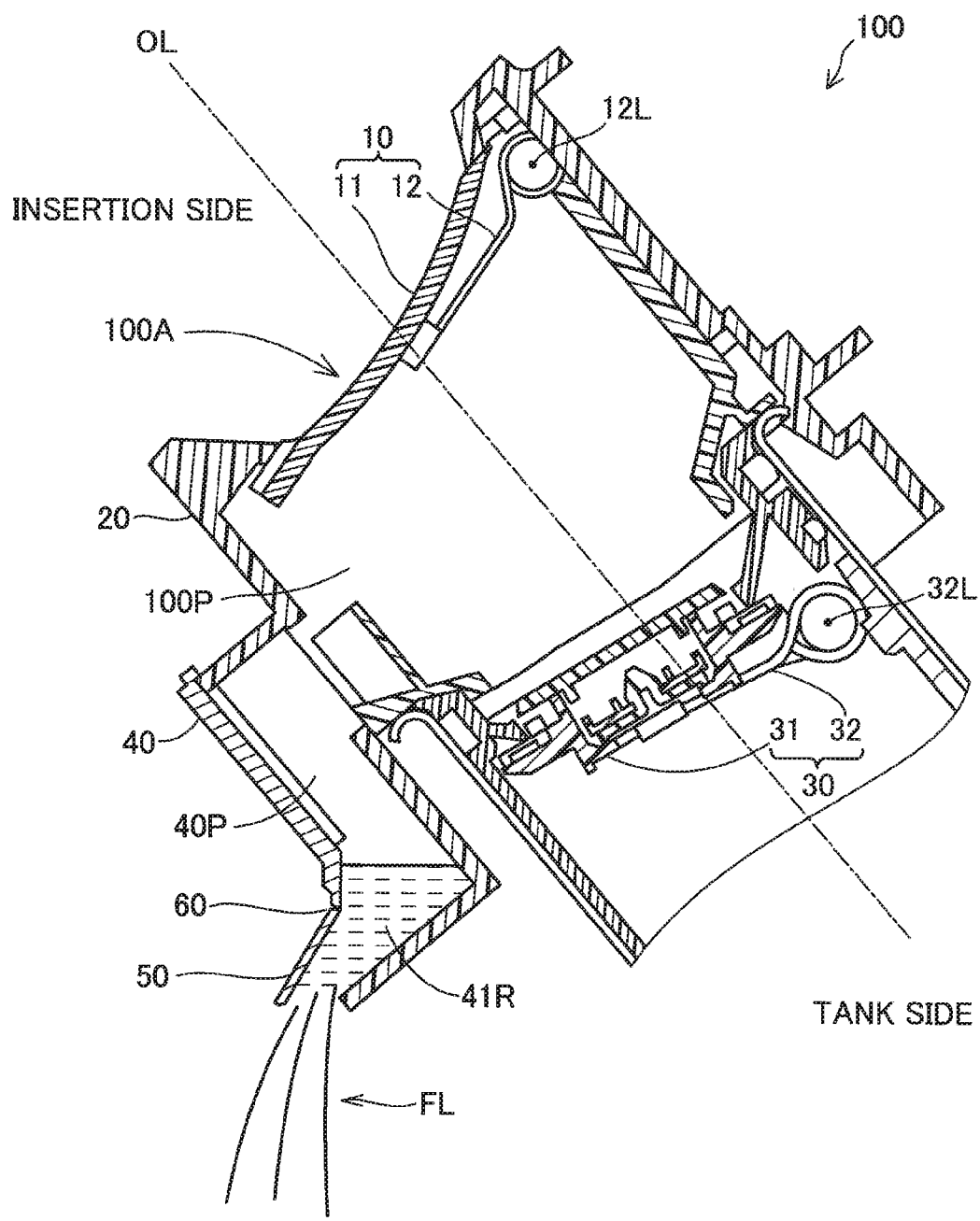
FIG. 4 is a sectional view illustrating the part of the filler neck in the state that an open-close valve is opened.

FIG. 4 is a sectional view illustrating the part of the filler neck 100 in the state that the open-close valve 50 is opened. FIG. 4 illustrates the filler neck 100 in the state that the open-close valve 50 is opened by accumulation of a predetermined or greater amount of liquid FL in the liquid reservoir 41R, so as to release the liquid FL accumulated in the liquid reservoir 41R to outside. As described above, when no or only a little liquid is accumulated in the liquid reservoir 41R, the open-close valve 50 is closed, so that the liquid discharge path 40P is not connected with outside of the filler neck 100. In other words, the open-close valve 50 uses the own weight of the open-close valve 50 as the force of closing the open-close valve 50. When a predetermined or a greater amount of liquid is accumulated in the liquid reservoir 41R and the mass of the accumulated liquid is increased to be greater than the force of pressing the open-close valve 50 in the closing direction (for example, the own weight of the open-close valve 50) as shown in FIG. 4, on the other hand, the open-close valve 50 rotates about the grooved portion 60 toward the outside of the filler neck 100. In this way the open-close valve 50 uses the mass of the liquid accumulated in the liquid reservoir 41R as the force of opening the open-close valve 50. Rotating the open-close valve 50 or more specifically opening the open-close valve 50 results in connecting the liquid discharge path 40P with outside of the filler neck 100 and causes the liquid accumulated in the liquid reservoir 41R to be flowed out of the filler neck 100.

As described above, in the filler neck 100 serving as the opening-closing apparatus for the fuel tank according to this embodiment, the liquid discharge path 40P is configured to connect the fuel passage 100P formed between the insertion-side opening-closing mechanism 10 and the tank-side opening-closing mechanism 30 with outside of the filler neck 100. The open-close valve 50 is configured to open and close between the liquid discharge path 40P and outside of the filler neck 100, so as to regulate the connection between the liquid discharge path 40P and outside of the filler neck 100. In the filler neck 100 of this embodiment, the fuel passage 100P thus does not continuously communicate with outside of the filler neck 100 via the liquid discharge path 40P. This accordingly reduces invasion of dust or the like from outside into the fuel passage 100P. While the fuel passage 100P does not continuously communicate with outside of the filler neck 100, the configuration of the embodiment enables the accumulated liquid to be discharged out of the filler neck 100 when the predetermined or greater amount of liquid is accumulated in the liquid reservoir 41R that is part of the liquid discharge path 40P. This configuration suppresses the liquid fuel from overflowing from the filler port 100A and also suppresses invasion of any undesired liquid such as rainwater into the fuel tank.

A known fueling apparatus conventionally used in a gas station is configured to suppress the fuel vapor generated in the course of supplying a liquid fuel to the vehicle from flowing out to the atmosphere. In this fueling apparatus, the periphery of a filler port 100A is surrounded by a cylindrical elastic body formed on the outer side of a fueling nozzle, so as to prevent the filler port 100A from communicating with the atmosphere in the course of fueling using the fueling nozzle. This configuration provides a negative pressure in a space formed between the cylindrical elastic body and a side face of a filler neck 100 and thereby prevents the fuel vapor from flowing out to the atmosphere but sucks out and removes the fuel vapor. Application of the filler neck 100 of the embodiment to the fueling process using the above fueling apparatus provides advantageous effects described below. In the filler neck 100 of the embodiment, in the state that the predetermined or greater amount of liquid is not accumulated in the liquid reservoir 41R, the open-close valve 50 is closed in a negative pressure generated by the pressure of the fuel passage 100P that is lower than the pressure on the outside of the filler neck 100, so that the fuel passage 100P does not communicate with outside of the filer neck 100. Accordingly the filler neck 100 of the embodiment does not require the above fueling apparatus to suck the atmosphere flowing through the liquid discharge path 40P into the fuel passage 100P in the course of fueling using the fueling apparatus and thereby reduces the required capacity of the fueling apparatus for suction and accumulation of the fuel vapor.

In the filler neck 100 of the embodiment, the own weight of the open-close valve 50 is used as the pressing force for closing the open-close valve 50. This does not require any additional member for pressing the open-close valve 50 and accordingly reduces the total number of components constituting the filler neck 100. This configuration reduces the manufacturing cost of the filler neck 100 and also reduces the man-hours to assemble the filler neck 100.

Additionally, in the filler neck 100 of the embodiment, the mass of the liquid accumulated in the liquid reservoir 41R, is used as the force of opening the open-close valve 50. This enables the open-close valve 50 to be opened and closed by the simple configuration.

In the filler neck 100 of the embodiment, the open-close valve 50 is provided as the plate-like member and is configured to rotate with respect to the grooved portion 60 that has the thinner wall than that of the remaining part, as the fulcrum. This also enables the open-close valve 50 to be opened and closed by the simple configuration.

B. Second Embodiment

Figure 5:
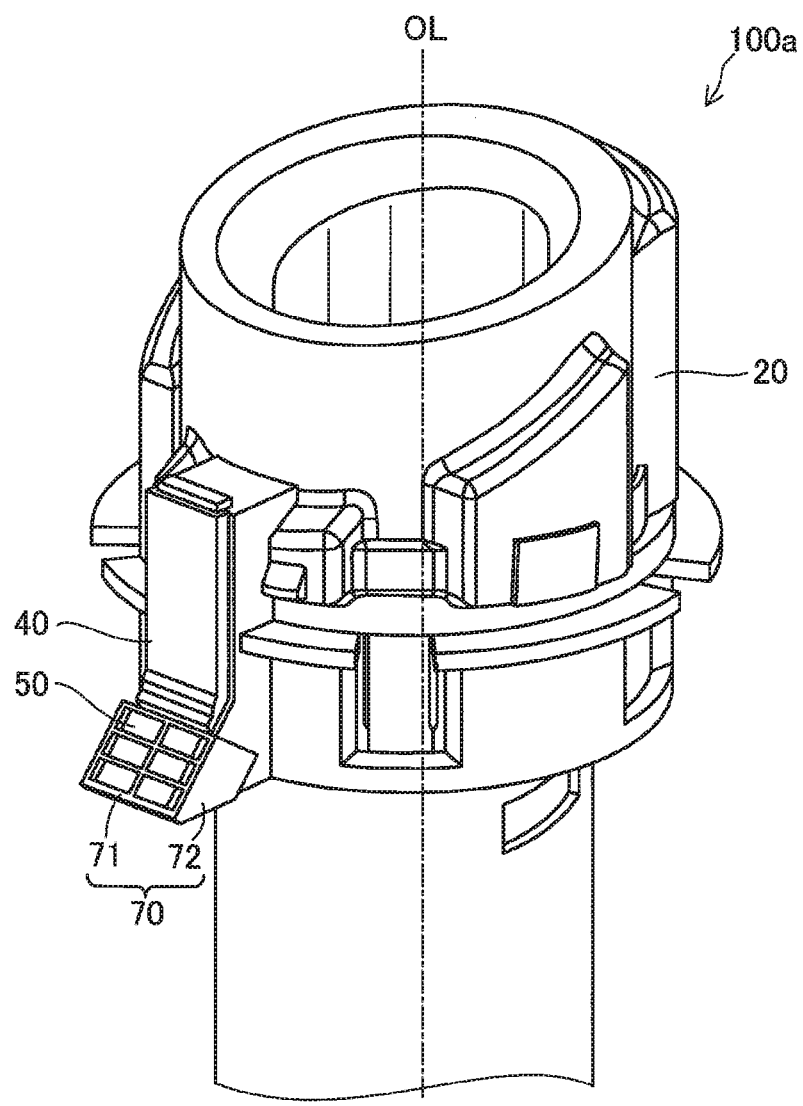
FIG. 5 is a perspective view illustrating a filler neck according to a second embodiment.

FIG. 5 is a perspective view illustrating a filler neck 100a according to a second embodiment. The filler neck 100a of the second embodiment differs from the filler neck 100 of the first embodiment by only that an open-close valve stopper 70 is additionally provided. Otherwise the configuration and the shape of the filler neck 100a of the second embodiment are similar to those of the filler neck 100 of the first embodiment. As shown in FIG. 5, the open-close valve stopper 70 is a member arranged to cover the outside of the open-close valve 50. The open-close valve stopper 70 may include a restriction element 71 formed by a rectangular framework having a predetermined thickness, and side face portions 72 and 73 arranged to be connected with the respective side faces of the restriction element 71. The side face portion 73 is omitted from the illustration of FIG. 5. The side face portion 72 and the side face portion 73 are arranged to be symmetric with respect to the restriction element 71. The side face portions 72 and 73 are fixed to the outside of the liquid discharge path-forming portion 40. Accordingly the open-close valve stopper 70 is fixed to the liquid discharge path-forming portion 40.

Figure 6:
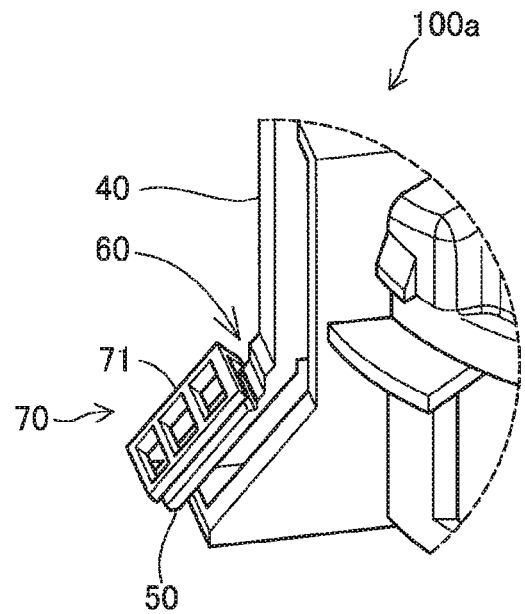
FIG. 6 is an enlarged perspective view illustrating part of the filler neck in the state that the open-close valve is opened according to the second embodiment.

FIG. 6 is an enlarged perspective view illustrating part of the filler neck 100a in the state that the open-close valve 50 is opened according to the second embodiment. FIG. 6 illustrates only peripheral members of the open-close valve stopper 70. For the purpose of better understanding the relationship between the restriction element 71 and the open-close valve 50, FIG. 6 illustrates the peripheral members of the open-close valve stopper 70 in a section taken along a plane that is perpendicular to the short direction of the liquid discharge path-forming portion 40, with omission of the side face portion 72. In the filler neck 100a of the second embodiment, the restriction element 71 is fixed to the liquid discharge path-forming portion 40 such as to cover the open-close valve 50. The open-close valve stopper 70 of this configuration serves to limit the angle in which the open-close valve 50 rotates about the grooved portion 60. In other words, the open-close valve stopper 70 serves to restrict the opening of the open-close valve 50.

As described above, in the filler neck 100a of the second embodiment, the open-close valve stopper 70 serves to restrict the opening of the open-close valve 50, so as to adjust the release amount and the release rate of the liquid accumulated in the liquid reservoir 41R. In the configuration without the open-close valve stopper 70, if the open-close valve 50 is plastically deformed due to repetition of the opening and closing operations, there is a possibility that the open-close valve 50 is not appropriately closed such that the liquid discharge path 40P provides a sealed space in a negative pressure. In the filler neck 100a of the second embodiment, on the other hand, the open-close valve stopper 70 restricts the opening of the open-close valve 50 and thereby reduces the possibility of elastic deformation of the open-close valve 50 due to repetition of the opening and closing operations. This configuration enables the state that the open-close valve 50 is appropriately closed such that the liquid discharge path 40P provides a sealed space in a negative pressure to be maintained for a longer time period, compared with the configuration without the open-close valve stopper 70.

C. Third Embodiment

Figure 7A:
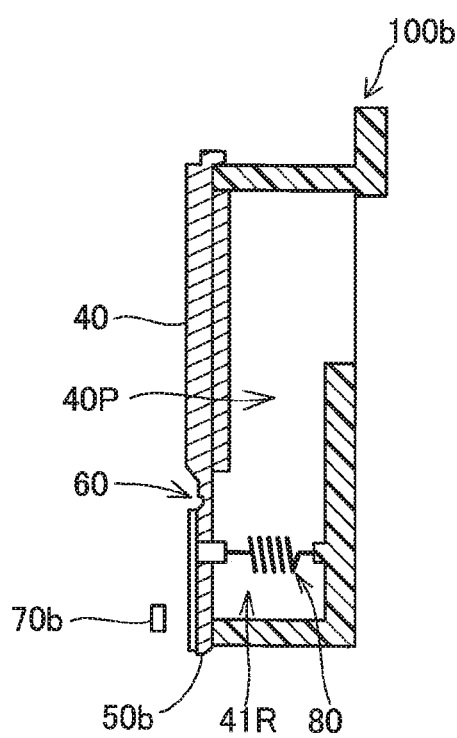
FIGS. 7A and 7B are sectional views illustrating the periphery of a liquid discharge path in a filler neck according to a third embodiment.
Figure 7B:
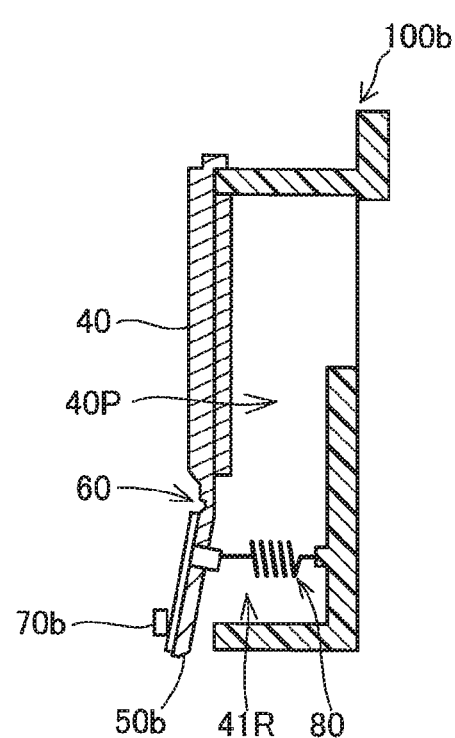

FIGS. 7A and 7B are sectional views illustrating the periphery of a liquid discharge path 40Pa in a filler neck 100b according to a third embodiment. The filler neck 100b of the third embodiment differs from the filler neck 100a of the second embodiment by that an open-close valve stopper 70b is formed in a different shape and that an open-close valve spring 80 is additionally provided as an elastic member to apply the pressing force for closing an open-close valve 50b. Otherwise the configuration of the filler neck 100b of the third embodiment is similar to the configuration of the filler neck 100a of the second embodiment. FIGS. 7A and 7B illustrate only the periphery of the configuration that is different from the filler neck 100a of the second embodiment. FIG. 7A illustrates the state that the open-close valve 50 is closed. FIG. 7B illustrates the state that the open-close valve 50 is opened.

As shown in FIGS. 7A and 7B, while the open-close valve stopper 70 of the second embodiment is formed in a planar shape, the open-close valve stopper 70b of the third embodiment is formed in a rod-like shape having a rectangular cross section. The open-close valve stopper 70b is formed to be parallel to a plane that is orthogonal to the axis OL (not shown) and to be parallel to a grooved portion 60. When the open-close valve 50b is opened, the open-close valve stopper 70b of this configuration serves to restrict the position at which the open-close valve 50b is opened in a predetermined range. In other words, the open-close valve stopper 70b serves to adjust the opening of the open-close valve 50b.

As shown in FIGS. 7A and 7B, the open-close valve spring 80 of the third embodiment is, for example, a coil spring that has one end fixed to part of the liquid discharge path-forming portion 40 and the other end fixed to the open-close valve 50b. The open-close valve spring 80 is arranged perpendicular to the grooved portion 60. Accordingly as shown in FIG. 7B, when the open-close valve 50b is opened, the open-close valve spring 80 is expanded. The open-close valve 50b is pressed in a closing direction by a contracting force of the open-close valve spring 80. The open-close valve spring 80 corresponds to the elastic member configured to apply the force of closing the open-close valve in the claims.

As described above, in the filler neck 100b of the third embodiment, the open-close valve stopper 70b serves to restrict the opening of the open-close valve 50b, so as to adjust the release amount and the release rate of the liquid accumulated in the liquid reservoir 41R. Like the second embodiment described above, in the filler neck 100b of the third embodiment, the open-close valve stopper 70b serves to restrict the opening of the open-close valve 50b, so that the open-close valve 50b is closed in a negative pressure. In the filler neck 100b of the third embodiment, the open-close valve spring 80 produces the pressing force for closing the open-close valve 50b. This configuration does not require to use the own weight of the open-close valve 50b, in order to close the open-close valve 50b. This configuration accordingly enhances the flexibility of design with regard to the position and the orientation of the filler neck 100b when the filler neck 100b is mounted on the vehicle. In the filler neck 100b of the third embodiment, the open-close valve spring 80 applies the pressing force for closing the open-close valve 50b. Accordingly, this configuration enables the mass of the liquid accumulated in the liquid reservoir 41R, which is required to open the open-close valve 50b, to be finely adjusted by regulating the pressing force of the open-close valve spring 80.

D. Fourth Embodiment

Figure 8:
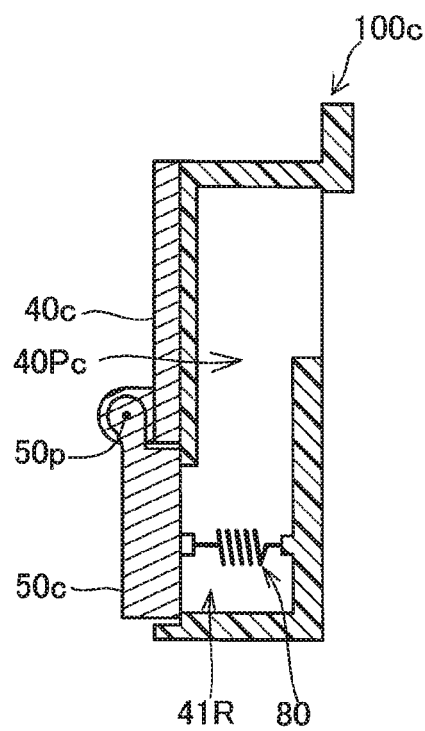
FIG. 8 is a sectional view illustrating the periphery of a liquid discharge path in a filler neck according to a fourth embodiment.

FIG. 8 is a sectional view illustrating the periphery of a liquid discharge path 40Pc in a filler neck 100c according to a fourth embodiment. The filler neck 100c of the fourth embodiment differs from the filler neck 100b of the third embodiment by that an open-close valve 50c is configured by a shaft support valve that is supported by a shaft and that the open-close valve stopper 70b is omitted. Otherwise the configuration of the filler neck 100c of the fourth embodiment is similar to the configuration of the filler neck 100b of the third embodiment. FIG. 8 illustrates only the periphery of the configuration that is different from the filler neck 100b of the third embodiment and the filler neck 100a of the second embodiment.

The open-close valve 50c of the fourth embodiment is, for example, a shaft support valve configured to rotate about a shaft 50p as the support end. The shaft 50p is fixed to part of the outer side of a liquid discharge path-forming portion 40c that is most distant from the fuel passage 100P The open-close valve 50c is formed such that its free end is located below the shaft 50p in the direction of gravity. In other words, the open-close valve 50c has the shaft 50p in its upper portion in the direction of gravity. The open-close valve 50c is connected with the open-close valve spring 80 in a plane facing the liquid discharge path 40Pc and is pressed in a closing direction of closing the open-close valve 50c. Like the filler neck 100b of the third embodiment, in the filler neck 100c, when the mass of the liquid accumulated in the liquid reservoir 41R becomes greater than the pressing force of the open-close valve spring 80 and the mass of the open-close valve 50c, the open-close valve 50c rotates to release the liquid accumulated in the liquid reservoir 41R. Accordingly, the configuration of the open-close valve 50c provided as the shaft support valve that is supported by for example, the shaft 50p also enables the mass of the liquid required for releasing the liquid accumulated in the liquid reservoir 41R to be finely adjusted by regulating the pressing force of the open-close valve spring 80.

E. Fifth Embodiment

Figure 9:
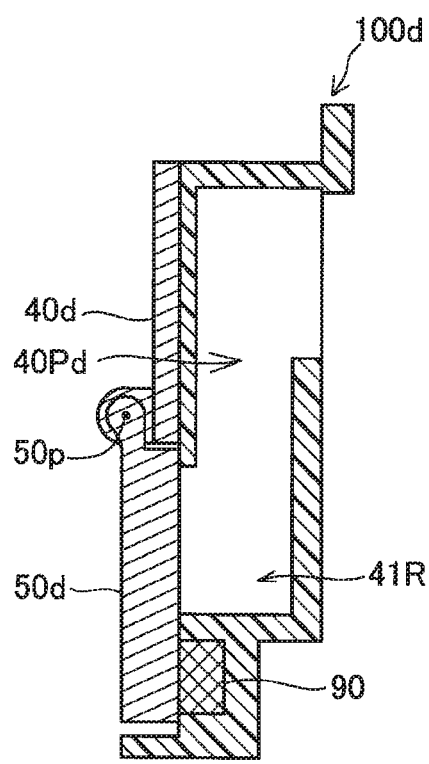
FIG. 9 is a sectional view illustrating the periphery of a liquid discharge path in a filler neck according to a fifth embodiment.

FIG. 9 is a sectional view illustrating the periphery of a liquid discharge path 40Pd in a filler neck 100d according to a fifth embodiment. The filler neck 100d of the fifth embodiment differs from the filler neck 100c of the fourth embodiment by that an open-close valve 50d is formed in a different shape, that the filler neck 100d is formed in a partly different shape, that a magnetic element 90 is additionally provided and that the open-close valve spring 80 is omitted. Otherwise the configuration of the filler neck 100d of the fifth embodiment is similar to the configuration of the filler neck 100c of the fourth embodiment. FIG. 9 illustrates only the periphery of the configuration that is different from the filler neck 100c of the fourth embodiment.

The filler neck 100d of the fifth embodiment may include the magnetic element 90 configured to press the open-close valve 50d in a closing direction of closing the open-close valve 50d. As shown in FIG. 9, the magnetic element 90 is, for example, a magnet located outside of the liquid discharge path 40Pd and in a lower portion of the filler neck 100d provided to form the liquid discharge path 40Pd. The filler neck 100d is configured such that the magnetic element 90 is located and fixed on a tank side of the lower portion of the filler neck 100d provided to form the liquid discharge path 40Pd. Like the fourth embodiment, the open-close valve 50d is, for example, an iron shaft support valve configured to rotate about a shaft 50p as the support end. The difference of the open-close valve 50d of the fifth embodiment from the open-close valve 50c of the fourth embodiment is that a plate-like portion configured to open and close the liquid discharge path 40Pd is extended downward. As shown in FIG. 9, in the state that the open-close valve 50d is closed, part of the metal open-close valve 50d is in close contact with the magnetic element 90. In other words, the filler neck 100d of the fifth embodiment uses the magnetic force generated between the open-close valve 50d and the magnetic element 90 as the pressing force. According to another embodiment, the magnetic element 90 may have any configuration that is partly magnetized.

As described above, the filler neck 100*d* of the fifth embodiment has the magnetic element 90 provided as the magnet and arranged to be opposed to the open-close valve 50*d*. The open-close valve 50*d* is made of metal and thereby receives the pressing force in the closing direction by the magnetic force. Accordingly, the configuration of the filler neck 100*d* of the fifth embodiment enables the mass of the liquid accumulated in the liquid reservoir 41R, which is required to open the open-close valve 50*d*, to be finely adjusted by regulating the strength of the magnetism in the magnetic element 90 and the open-close valve 50*d*.

F. Modifications

The disclosure is not limited to the above embodiments but may be implemented by any of various other aspects without departing from the scope of the disclosure. Some of possible modifications are given below.

F-1. Modification 1

Figure 10:
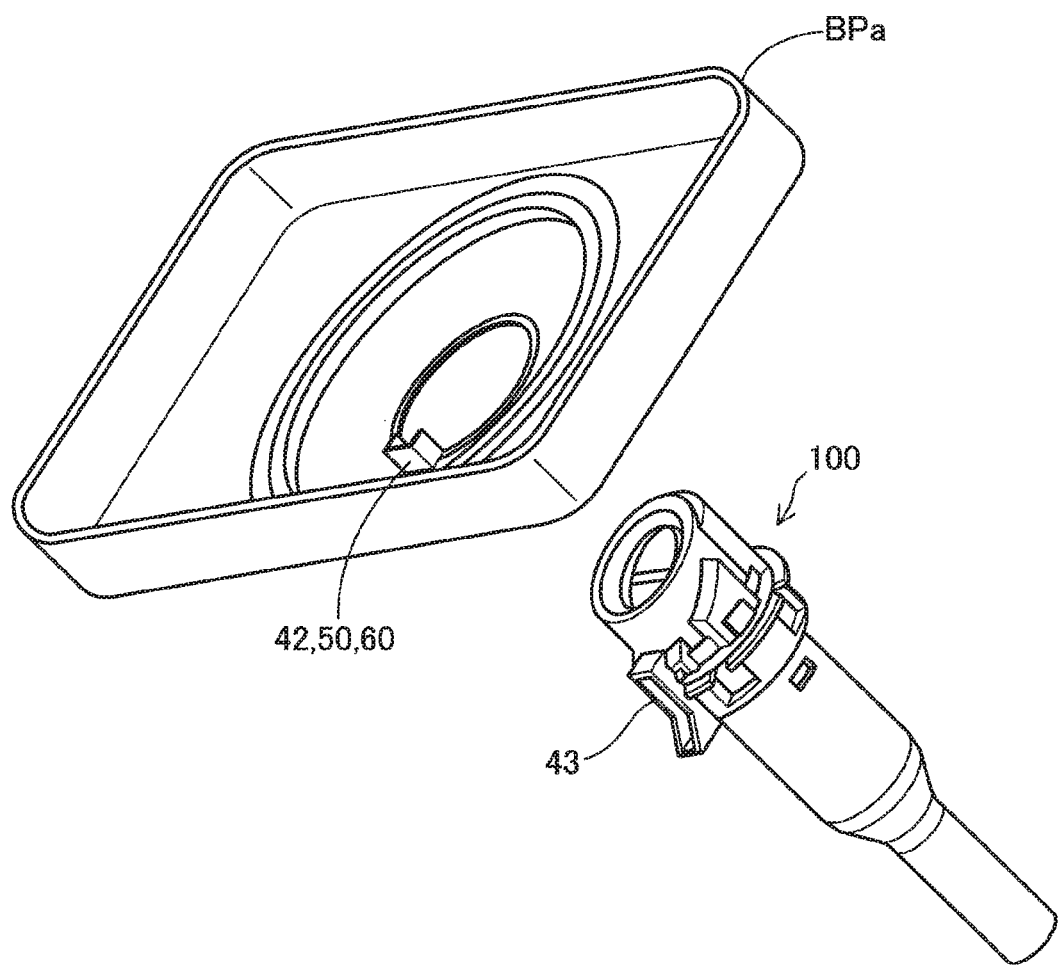
FIG. 10 is a perspective view illustrating mounting of the filler neck to a base plate according to a modification.

FIG. 10 is a perspective view illustrating mounting of the filler neck 100 to a base plate BPa according to Modification 1. More specifically FIG. 10 illustrates the state that the filler neck 100 of the first embodiment is mounted to the base plate BPa that is different from the base plate BP illustrated in the first embodiment. As shown in FIG. 10, a liquid discharge path-forming portion 40 may include a liquid discharge path base plate portion 43 that is fixed to the fuel passage-forming portion 20, and a liquid discharge path outer circumferential portion 42 that is to be mounted to the base plate BPa prior to the filler neck 100 including the liquid discharge path base plate portion 43. Like the liquid discharge path outer circumferential portion 42, the open-close valve 50 including the grooved portion 60 is also mounted to the base plate BPa prior to the filler neck 100 including the liquid discharge path base plate portion 43. In this state, the filler neck 100 including the liquid discharge path base plate portion 43 is translated in parallel such that the liquid discharge path outer circumferential portion 42 is joined with the liquid discharge path base plate portion 43. This causes the filler neck 100 to be fixed to the base plate BPa. In this manner, the liquid discharge path-forming portion 40 may be used as the positioning member in the process of fixing the filler neck 10 to the vehicle. This configuration enables the filler neck 100 to be located at an accurate position relative to the vehicle.

F-2. Modification 2

The above first embodiment describes the specific configuration of the insertion-side opening-closing mechanism 10 and the tank-side opening-closing mechanism 30. The configuration of the insertion-side opening-closing mechanism 10 and the tank-side opening-closing mechanism 10 may, however, not be necessarily limited to the configuration of the first embodiment but may be changed or modified in any of various ways. For example, the insertion-side opening-closing mechanism 10 and the tank-side opening-closing mechanism 30 may not use the insertion-side spring 12 and the tank-side spring 32 but may be configured to be opened and closed in response to detection of a fueling nozzle by; for example, an infrared sensor. Even when the pressing forces of the insertion-side spring 12 and the tank-side spring 32 are used respectively to open and close the insertion-side opening-closing mechanism 10 and the tank-side opening-closing mechanism 30, the insertion-side spring 12 and the tank-side spring 32 may not be necessarily limited to the elastic members that are configured to rotate but may be other elastic members such as coil springs. Even when the elastic members configured to rotate about the fixation end 12L and about the fixation end 32L as described in the first embodiment are employed for the insertion-side spring 12 and the tank-side spring 32, the positions of the fixation end 12L and the fixation end 32L may be changed or modified in any of various ways. For example, the fixation end 12L may be located on the opposite side of the fixation end 32L with respect to the axis OL.

In the first to the third embodiments described above, the liquid discharge path-forming portion 40 is configured to form the liquid discharge path 40P as the flow path that is arranged parallel to the fuel passage 100P. The configuration and the position of the liquid discharge path 40P may, however, be changed or modified in any of various ways. For example, the liquid discharge path 40P may be formed in a spiral shape on a side face of the fuel passage-forming portion 20, and the open-close valve 50 may be configured to allow for and block the communication between the fuel passage-forming portion 20 and the outside of the filler neck 100.

In the first to the third embodiments described above, the liquid reservoir 41R is formed in the part of the liquid discharge path 40P that is adjacent to the open-close valve 50. The configuration and the arrangement of the liquid reservoir 41R may, however, be changed or modified in any of various ways. For example, the liquid discharge path 40P may be provided with a plurality of open-close valves, so that the liquid reservoir 41R may be formed as a different space from the liquid discharge path 40P.

In the first to the third embodiments described above, the open-close valve 50 is formed in a flat plate-like shape and is opened and closed by being rotated about the grooved portion 60 that is formed to be thinner than the remaining part of the open-close valve 50. The configuration of the open-close valve 50 and the configuration of the grooved portion 60 may, however, be changed or modified in any of various ways. For example, the open-close valve 50 may be formed in a disk-like shape. The open-close valve 50 may be hung in the direction of gravity by means of, for example, the open-close valve spring 80 described in the third embodiment. This open-close valve 50 may not be opened or closed by rotation but may be opened and closed by parallel translation along the direction of gravity by the mass of the liquid accumulated in the liquid reservoir 41R.

The configuration of the open-close valve stopper 70 may not be necessarily limited to the configurations illustrated in the second embodiment and the third embodiment described above but may be changed or modified in any of various ways. For example, the open-close valve stopper 70 may be configured in a rod-like shape that is arranged perpendicular to the longitudinal direction of the grooved portion 50 or may be configured to restrict the opening of the open-close valve 50 at a point.

In the embodiments described above, the own weight of the open-close valve 50, the open-close valve spring 80, and the magnetic force in the open-close valve 50*d* and the magnetic element 90 are described as the examples of the pressing force for closing the open-close valve 50 (50*b*, 50*c*, 50*d*). The pressing force used may be any combination of these examples. For example, the configuration of the open-close valve spring 80 may be added to the filler neck 100*d* of the fifth embodiment including the magnetic element 90, in order to apply the pressing force generated by the open-close valve spring 80 as the force of closing the open-close valve 50*d*.

The disclosure is not limited to any of the embodiments, the examples, and the modifications described above but may be implemented by a diversity of other configurations without departing from the scope of the disclosure. For example, the technical features of any of the embodiments, the examples and the modifications corresponding to the technical features of each of the aspects described in SUMMARY may be replaced or combined appropriately in order to solve part or all of the problems described above or in order to achieve part or all of the advantageous effects described above. Any of the technical features may be omitted appropriately unless the technical feature is described as essential herein.

What is claimed is:

1. An opening-closing apparatus for a fuel tank, comprising:
    a fuel passage-forming portion configured to form a fuel passage that is arranged to introduce a supplied liquid fuel to the fuel tank;
    an insertion-side opening-closing mechanism fixed to the fuel passage-forming portion and configured to open and close a filler port of the fuel passage;
    a tank-side opening-closing mechanism fixed to the fuel passage-forming portion, located on a fuel tank side of the insertion-side opening-closing mechanism and configured to open and close the fuel passage;
    a liquid discharge path configured to allow for communication of a portion of the fuel passage between the insertion-side opening-closing mechanism and the tank-side opening-closing mechanism with outside of the opening-closing apparatus; and
    an open-close valve configured to open and close the liquid discharge path and to be opened toward the outside of the opening-closing apparatus, wherein
    the liquid discharge path has a liquid reservoir in which a liquid is temporarily accumulated when the open-close valve is closed,
    the open-close valve is configured such that mass of the liquid accumulated in the liquid reservoir is utilized as a force of opening the open-close valve,
    the open-close valve is formed as part of a plate member, and
    the open-close valve has a support end that is a grooved portion formed in the plate member to be thinner than a remaining part of the open-close valve.

2. The opening-closing apparatus for the fuel tank according to claim 1,
    wherein the open-close valve is further configured such that mass of the open-close valve is further utilized as a force of closing the open-close valve.

3. The opening-closing apparatus for the fuel tank according to claim 2, further comprising:
    a magnetic element that has a portion opposed to the open-close valve and at least partly magnetized and that is fixed in position relative to the liquid discharge path, wherein
    the open-close valve is made of a magnetic material such that a portion of the open-close valve opposed to the magnetic element is in close contact with the magnetic element.

4. The opening-closing apparatus for the fuel tank according to claim 3, further comprising:
    an elastic member configured to apply a force of closing the open-close valve.

5. The opening-closing apparatus for the fuel tank according to claim 4, further comprising:
    an open-close valve stopper configured to restrict an opening of the open-close valve.

6. An opening-closing apparatus for a fuel tank, comprising:
    a fuel passage-forming portion configured to form a fuel passage that is arranged to introduce a supplied liquid fuel to the fuel tank;
    an insertion-side opening-closing mechanism fixed to the fuel passage-forming portion and configured to open and close a filler port of the fuel passage;
    a tank-side opening-closing mechanism fixed to the fuel passage-forming portion, located on a fuel tank side of the insertion-side opening-closing mechanism and configured to open and close the fuel passage;
    a liquid discharge path configured to allow for communication of a portion of the fuel passage between the insertion-side opening-closing mechanism and the tank-side opening-closing mechanism with outside of the opening-closing apparatus; and
    an open-close valve configured to open and close the liquid discharge path and to be opened toward the outside of the opening-closing apparatus, wherein
    the liquid discharge path has a liquid reservoir in which a liquid is temporarily accumulated when the open-close valve is closed,
    the open-close valve is configured such that mass of the liquid accumulated in the liquid reservoir is utilized as a force of opening the open-close valve, and
    the open-close valve is formed from a plate member, has a shaft as a support end in an upper portion of the open-close valve and is rotated about the shaft.

7. The opening-closing apparatus for the fuel tank according to claim 6,
    wherein the open-close valve is configured such that mass of the open-close valve is utilized as a force of closing the open-close valve.

8. The opening-closing apparatus for the fuel tank according to claim 7, further comprising:
    a magnetic element that has a portion opposed to the open-close valve and at least partly magnetized and that is fixed in position relative to the liquid discharge path, wherein
    the open-close valve is made of a magnetic material such that a portion of the open-close valve opposed to the magnetic element is in close contact with the magnetic element.

9. The opening-closing apparatus for the fuel tank according to claim 8, further comprising:
    an open-close valve stopper configured to restrict an opening of the open-close valve.

10. The opening-closing apparatus for the fuel tank according to claim 7, further comprising:
    an elastic member configured to apply a force of closing the open-close valve.

11. The opening-closing apparatus for the fuel tank according to claim 10, further comprising:
    an open-close valve stopper configured to restrict an opening of the open-close valve.

* * * * *